(12) United States Patent
Smirnov et al.

(10) Patent No.: US 8,078,805 B1
(45) Date of Patent: Dec. 13, 2011

(54) METHOD AND SYSTEM FOR COMMUNICATING WITH A UNIVERSAL SERIAL BUS DEVICE

(75) Inventors: Pavel Smirnov, Ramat Gan (IL); Haim Kupershmidt, Or Yehuda (IL); Stanislav Cherny, Ganei Aviv (IL); Daniel Halperin, Tel-Aviv (IL); Gadi Shor, TelAviv (IL)

(73) Assignee: Wisair Ltd., Tel-Aviv (IL)

( * ) Notice: Subject to any disclaimer, the term of this patent is extended or adjusted under 35 U.S.C. 154(b) by 833 days.

(21) Appl. No.: 11/868,503

(22) Filed: Oct. 7, 2007

(51) Int. Cl.
*G06F 13/00* (2006.01)
(52) U.S. Cl. .......... 711/137; 711/133; 711/103; 711/213
(58) Field of Classification Search .................. 711/137, 711/103, 133, 213
See application file for complete search history.

(56) References Cited

U.S. PATENT DOCUMENTS

| | | | | |
|---|---|---|---|---|
| 6,073,205 | A | * | 6/2000 | Thomson ...................... 711/100 |
| 2003/0105926 | A1 | * | 6/2003 | Rodriguez .................... 711/129 |
| 2006/0064547 | A1 | * | 3/2006 | Kottapalli et al. ............. 711/133 |

* cited by examiner

*Primary Examiner* — Jae Yu
(74) *Attorney, Agent, or Firm* — Reches Patents

(57) ABSTRACT

A caching filter driver which is adapted for communicating with a universal serial bus (USB) mass storage device, the caching filter driver is adapted to: (a) receive a first reading request for a first size data from a USB mass storage driver; (b) determine if requested data which is requested in the first reading request is included in a prefetched read data cache; (c) issue a second reading request for a second size data to the USB mass storage device; and store the second size data in the prefetched read data cache, if the requested data is not included in the prefetched read data cache; and to (d) provide the requested data from the prefetched read data cache; wherein the second size is larger than the first size and the second size data includes the first size data; wherein the caching filter driver resides below the USB mass storage driver.

7 Claims, 11 Drawing Sheets

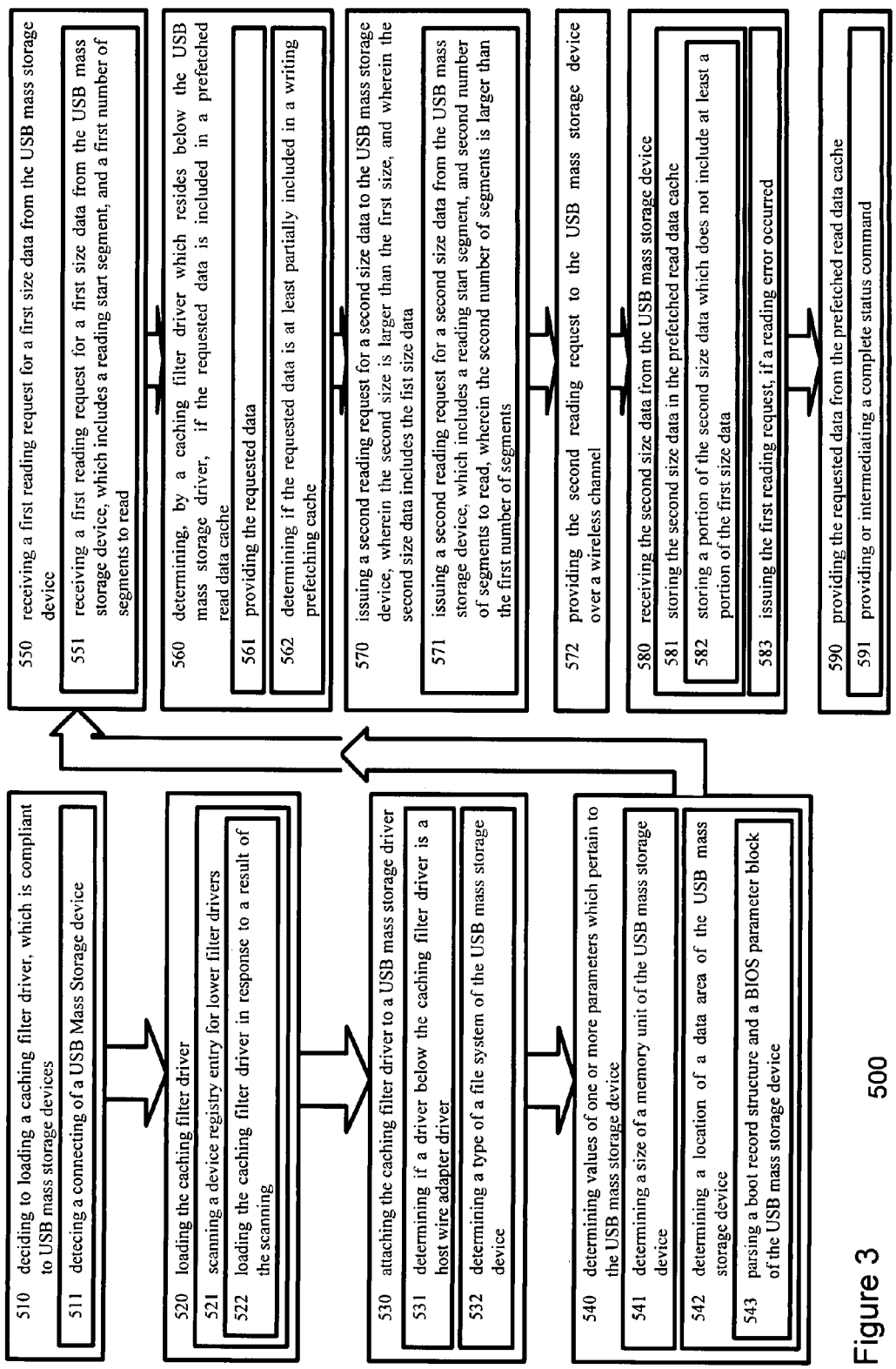
Figure 3      500

METHOD AND SYSTEM FOR COMMUNICATING WITH A UNIVERSAL SERIAL BUS DEVICE

FIELD OF THE INVENTION

The invention relates to methods and drivers for communicating with a universal serial bus

BACKGROUND OF THE INVENTION

USB mass storage devices are of everyday use, and are conveniently used to store data, and therefore are adapted for receiving data which is written to the USB mass storage device, and to provide data which is read from the USB mass storage device.

It is also of common use to read and to write data from USB mass storage device wirelessly, wherein the USB mass storage device may be a native wireless USB mass storage device, or a standard USB mass storage device which is communicating wirelessly via a device wire adapter to which it is connected.

FIGS. 1a through 1d illustrate connection of USB mass storage device 910 to host 920, according to different known prior art connection configurations, FIG. 1a illustrates a connection of USB mass storage device 910 to host 920, which is known in the prior art, wherein the wireless communication is facilitated by device wire adapter 912 which is connected to USB mass storage device 910, and by host wire adapter 922 which is connected to host 920.

FIG. 1b illustrates a connection of Native wireless USB mass storage device 910 to host 920, which is known in the prior art, wherein the wireless communication is facilitated by host wire adapter 922 which is connected to host 920.

FIG. 1c illustrates a connection of USB mass storage device 910 to native wireless USB host 920, which is known in the prior art, wherein the wireless communication is facilitated by device wire adapter 912 which is connected to USB mass storage device 910.

FIG. 1d illustrates a connection of native wireless USB mass storage device 910 to native wireless USB host 920, which is known in the prior art.

It is noted that the possible configurations of connecting USB mass storage devices 910 to hosts 920 are not exhausted by the configurations which are illustrated in FIGS. 1a through 1d.

In the configuration which is illustrated, however, as well in many different configurations which are known in the art, the wireless connection via a device wire adapter and/or a host wire adapter demands using a USB communication protocol which is adapted for wired communication rather than for wireless communication, either in the communication between USB mass storage device 910 to device wire adapter, in the communication between host 920 to host wire adapter 912, or in both of those communications.

Inefficiencies in such an employment of non native wireless protocol, as well as other reasons which are known in the art, result in an inefficient utilization of the wireless channel. Especially, as known to any person who is skilled in the art, the transmitting of short transmission rather than longer one results in a lesser utilization of the wireless channel, such as due to transmission overheads.

FIG. 2 is a block diagram of memory unit 100 of a USB mass storage device, which is known in the prior art. Conveniently, memory unit storage 100 includes system area 110 and data area 120.

System area 110 includes boot record 112, BIOS parameter block 144 which conveniently includes basic information pertaining to a file system of the USB mass storage device (such as a type of the file system and pointers to locations of other sections), and possibly additional reserved area 118, wherein a total size of reserved sectors is conveniently indicated by a field which is included in boot record 112.

System area 110 also includes file allocation table (FAT) region 116 which includes one or more copies of a file allocation table of the USB mass storage device. The file allocation table map data area 120, by indicating which clusters are used by each of the different files and directories which are stored by the USB mass storage device.

Data area 120 includes root directory 122, in which other directories 124 are stored, and wherein files 126 are stored in root directory 122 or in one of directories 124.

The accesses to the USB mass storage device however, be it reading or writing, are not random, and frequently, consecutive accesses to the USB mass storage device are accesses to consecutive locations in a memory unit of the USB mass storage device.

As communication to and from the USB mass storage device is handled by a USB mass storage driver of the host and via a host wire adapter driver which manages an operation of the host wire adapter, it is therefore impossible to install a caching filter driver, which resides in the existing driver stack, below the USB mass storage driver, in order to cache data before it is sent to the USB mass storage device so as to facilitate a transmitting of larger transmission, and/or to prefetch data which is read from the USB mass storage device, so as to reduce the number of accesses to the USB mass storage device when reading data from it.

It is therefore desirable to find reliable and simple means of communicating with a USB mass storage device by a caching filter driver.

SUMMARY OF THE INVENTION

A method for communicating with a universal serial bus (USB) mass storage device, the method includes: (a) receiving a first reading request for a first size data from a USB mass storage driver; (b) determining, by a caching filter driver which resides below the USB mass storage driver, if requested data which is requested in the first reading request is included in a prefetched read data cache; (c) issuing a second reading request for a second size data to the USB mass storage device; and storing the second size data in the prefetched read data cache, if the requested data is not included in the prefetched read data cache; and (d) providing the requested data from the prefetched read data cache; wherein the second size is larger than the first size and the second size data includes the first size data.

A method for communicating with a universal serial bus (USB) mass storage device, the method includes: (a) receiving a first writing request of a first size data from a USB mass storage driver; (b) determining, by a caching filter driver which resides below the USB mass storage driver, if the first size data is suitable for caching in a writing cache; (c) issuing a second writing request of a second size data that is stored in the writing cache, if the first size data is not suitable for caching in the writing cache, wherein the second writing request is provided to the USB mass storage device; and (d) caching the first size data in the writing cache.

A caching filter driver which is adapted for communicating with a universal serial bus (USB) mass storage device, the caching filter driver is adapted to: (a) receive a first reading request for a first size data from a USB mass storage driver;

(b) determine if requested data which is requested in the first reading request is included in a prefetched read data cache; (c) issue a second reading request for a second size data to the USB mass storage device; and store the second size data in the prefetched read data cache, if the requested data is not included in the prefetched read data cache; and to (d) provide the requested data from the prefetched read data cache; wherein the second size is larger than the first size and the second size data includes the first size data; wherein the caching filter driver resides below the USB mass storage driver.

A caching filter driver which is adapted for communicating with a universal serial bus (USB) mass storage device, the caching filter driver is adapted to: (a) receive a first writing request of a first size data from a USB mass storage driver; (b) determine if the first size data is suitable for caching in a writing cache; (c) issue a second writing request of a second size data that is stored in the writing cache, if the first size data is not suitable for caching in the writing cache, wherein the second writing request is provided to the USB mass storage device; and to (d) cache the first size data in the writing cache; wherein the caching filter driver resides below the USB mass storage driver.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 3 illustrates a method for communicating with a USB mass storage device, according to an embodiment of the invention;

DETAILED DESCRIPTION OF THE DRAWINGS

It should be noted that the methods which are disclosed in the detailed description of the drawings could be carried out, according to some of the different embodiments of the invention, for systems such as, though not limited to, those which are illustrated in FIGS. 1a through 1d.

It is further noted that the methods which are disclosed in the detailed description of the drawings could be carried out, according to an embodiment of the invention, also over a wired channel.

FIG. 3 illustrates method 500 for reading and prefetching data from a USB mass storage device, according to an embodiment of the invention.

According to an embodiment of the invention, method 500 starts with stage 510 of deciding to load a caching filter driver, which is compliant to USB mass storage devices. It is noted that conveniently, the caching filter driver is not necessary for an ordinary operation of the USB mass storage driver, and therefore, according to an embodiment of the invention, may be loaded when needed. Conveniently, the deciding is carried out externally to the caching filter driver.

According to an embodiment of the invention, the deciding is triggered by stage 511 of detecting a connecting of a USB mass storage device. It is further noted that in situation in which the caching filter driver is already loaded, the detecting of a connecting of the USB mass storage device, according to an embodiment of the invention, triggers an attaching the caching filter driver to the connected USB mass storage device and to one or more drivers of the USB mass.

Figure 4A:
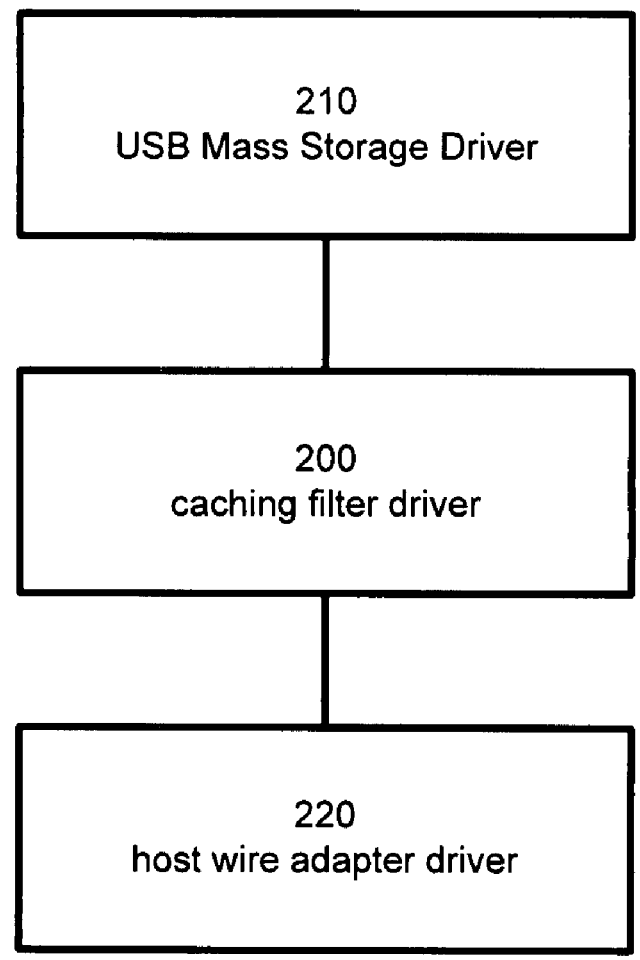
FIGS. 4a and 4b illustrate a caching filter driver which is a lower filter driver for a USB mass storage driver, and a host wire adapter driver, according to different embodiments of the invention.
Figure 4B:
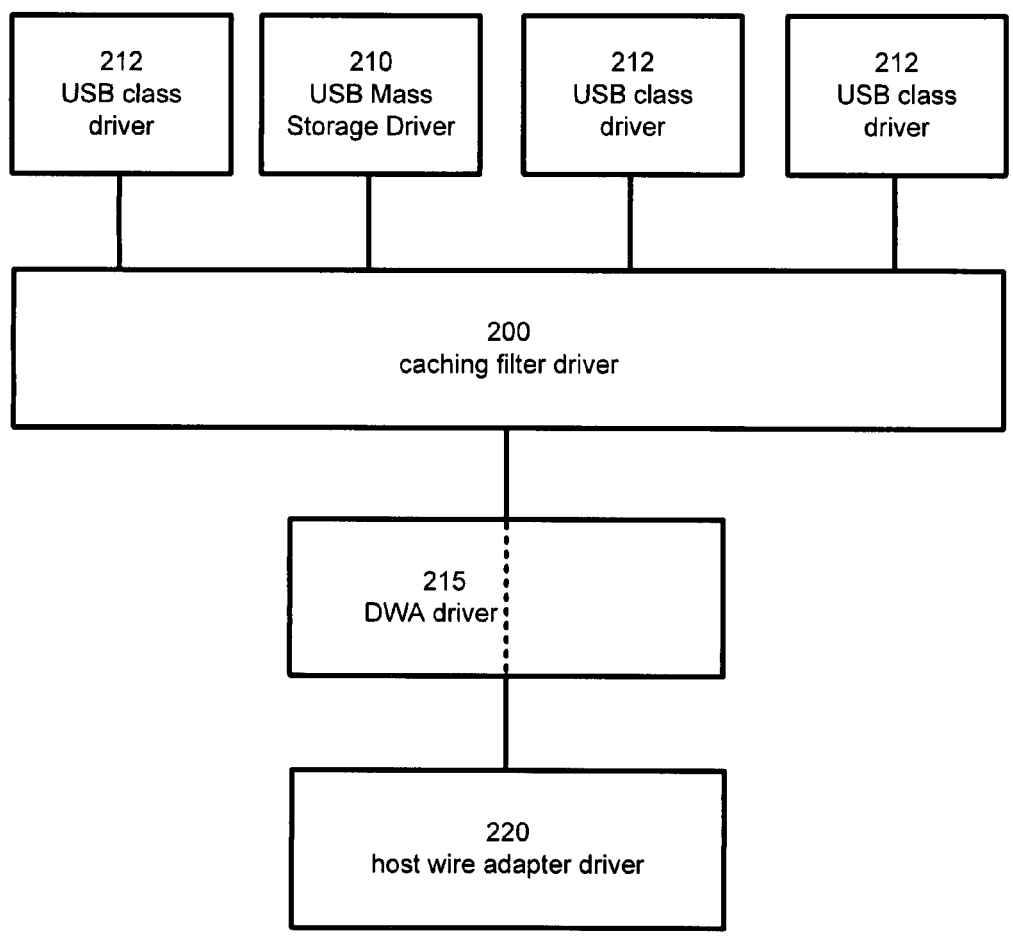

According to an embodiment of the invention, method 500 continues with stage 520 of loading the caching filter driver. Referring now to FIGS. 4a and 4b, the loading includes loading caching filter driver 200 as lower filter driver between USB mass storage driver 210 and host wire adapter driver (HWA driver) 220. Conveniently, caching filter driver 200 is adapted to operate in a manner which is transparent to USB mass storage driver 210 and to HWA driver 220. It is noted that, conveniently, caching filter driver 200 is a USB class filter driver.

It is clear to a person who is skilled in the art that the architectures suggested in FIGS. 4a and 4b allow a capturing by caching filter driver 200 all the commands and the data which are issued by USB mass storage driver 210 to the USB mass storage device. It is further clear to a person who is skilled in the art that in order to support such architecture, caching filter driver 200 should conveniently be defined as a lower filter driver for the USB mass storage driver.

Referring now back to FIG. 3, stage 520 of loading the caching filter driver includes stage 521 of scanning a device registry entry for lower filter drivers, wherein conveniently stage 520 also includes stage 522 of loading the caching filter driver in response to a result of the scanning.

According to an embodiment of the invention, method 500 continues with stage 530 of attaching the caching filter driver to the USB mass storage driver. According to an embodiment of the invention, the attaching is carried out by a user mode application which runs on the background.

According to an embodiment of the invention, stage 530 includes stage 531 of determining if a driver below the caching filter driver is a host wire adapter driver, wherein either the loading of the caching filter driver or an operation of the caching filter driver (embodiments of which are described below) is responsive to a result of the determining of stage 531 (it is noted that according to some embodiment of the invention in which the host is a native wireless host, stage 531 may include determining if the driver below the caching filter driver is adapted for wireless host controller interface).

It is noted that more than one USB mass storage device may be connected to a system, and that conveniently, a prefetching which is carried out by the caching filter driver is to be carried out only for USB mass storage devices which are connected wirelessly to the system via a host wire adapter (HWA), and therefore it is desirable to determine to each of the USB mass storage devices if it is connected to the system via a HWA. According to an embodiment of the invention, stage 531 includes issuing to a stack, by the caching filter driver, a query interface request which includes an interface identification which is only supported by the HWA driver.

According to an embodiment of the invention, stage 530 further includes stage 532 of determining a type of a file system of the USB mass storage device, wherein the caching filter driver is only adapted to support certain types of files systems, and wherein the loading of stage 530 is conveniently responsive to a result of the determining of the type of the file system of the USB mass storage device.

It is noted that, according to an embodiment of the invention, the caching filter driver is adapted to support only USB mass storage device with a file system which implement either FAT32 or FAT16, wherein all the transactions to USB mass storage devices which implement another type of file system are intermediated as is.

It is noted that according to an embodiment of the invention, method 500 further includes unloading the caching filter driver when no longer needed (such as a result of disconnecting the USB mass storage device).

According to an embodiment of the invention, method 500 continues with stage 540 of determining values of one or more parameters which pertain to the USB mass storage device. Conveniently, stage 540 is carried out by the caching filter driver.

According to an embodiment of the invention, stage 540 includes stage 541 of determining a size of a memory unit of the USB mass storage device. As is detailed below, method 500 includes prefetching of consecutive sectors from the memory unit, and therefore it is desirable to prevent issuing of a second reading request which refers to inexistent sectors (i.e. out of boundaries caching). According to an embodiment of the invention, the determining of the size of the memory unit is carried out by issuing a read capacity mass storage command.

According to an embodiment of the invention, stage 540 includes stage 542 of determining a location of data area 120 of the USB mass storage device. It is noted that conveniently, the caching filter driver is adapted to handle transactions of data from data area 120, and to intermediate data transactions of data which belongs to system area 110 without further handling. It is clear to any person who is skilled in the art that locations which are accesses in system area 110 are more scattered in comparison to accesses to data in data area 120, and it is less likely that prefetched consecutive sectors in system area 110 will be required in consecutives readings. Therefore, according to an embodiment of the invention, the determining of the location of data area 120 is required to facilitate the handling by the caching filter driver of only the reading requests which requests data from data area 120, as is detailed below.

According to an embodiment of the invention, stage 542 includes stage 543 of parsing a boot record structure and a BIOS parameter block of the USB mass storage device, wherein the parsing facilitates the determining of the location of data area 120.

Method 500 continues with stage 550 of receiving a first reading request for a first size data from the USB mass storage device, wherein the first reading request is conveniently received from the USB mass storage driver. It is noted that according to an embodiment of the invention, the first size is 64 Kb. It is further noted that according to an embodiment of the invention, method 500 supports a reception of first reading requests of data of different first sizes.

According to an embodiment of the invention, stage 500 includes stage 551 of receiving a first reading request for a first size data from the USB mass storage device, which includes a reading start segment, and a first number of segments to read. It is noted that conveniently, the receiving also includes receiving a memory location of the host, where the first size data should be stored.

Stage 550 is followed by stage 560 of determining, by the caching filter driver which resides below the USB mass storage driver, if the requested data is included in a prefetched read data cache, which is conveniently stored at the host. It is noted that according to some embodiments of the invention, the caching filter driver is adapted to manage separate cachees for reading and for writing. Conveniently, stage 560 includes parsing the first reading request, so as to determine location and size of the requested data.

It is noted that frequently, the USB mass storage driver first request a first size data and on the following first reading request requests a second first size data which is consecutive to the first size data. The prefetched read data cache conveniently stores consecutive first size data, and therefore on many occasion the second first size data which is requested was already prefetched by the caching filter driver, and thus does not require an additional wireless transmission.

It is noted that the requested data may not be included in the prefetched read data cache on different situations, such as when the requested data is not consecutive to the previous requested data, or when the requested data is at least partly out of the prefetched read data cache bounds.

In situation in which the requested data is included in the prefetched read data cache, stage 560 conveniently includes stage 561 of providing the requested data, wherein the requested data is conveniently provided to the USB mass storage driver. According to an embodiment of the invention, stage 561 includes providing a complete status command to the USB mass storage driver, conveniently in response to a get status command which is issued by the USB mass storage command.

Following such a situation, the following stages of method 500 are usually not required, and the caching filter driver waits until another first reading request is received.

According to an embodiment of the invention in which the caching filter driver is adapted to manage separate cachees for reading and for writing, stage 560 further includes stage 562 of determining if the requested data is at least partially included in a writing prefetching cache, wherein if the requested data is at least partially included in a writing prefetching cache, stage 562 conveniently includes waiting for a writing of data which is stored in the writing prefetching cache before continuing the carrying out of method 500.

In situations in which the requested data is not included in the prefetched read data cache, stage 560 is followed by stage 570 of issuing a second reading request for a second size data to the USB mass storage device, wherein the second size is larger than the first size, and wherein the second size data includes the first size data. It is noted that conveniently, the second size conforms to a size of the prefetched read data cache. According to some of the embodiments of the invention, some second sizes which are supported are 128 Kb, 256 Kb, 512 Kb and the like. It is further noted that according to an embodiment of the invention, method 500 supports an issuing of second reading requests of data of different second sizes. By way of an example only, and not intending to limit the scope of the invention in any way, according to an embodiment of the invention, method 500 includes receiving first reading requests from multiple applications, wherein it is sometimes desirable to store multiple smaller second size pieces of data in the prefetched read data cache, so as to prefetch data for the different multiple applications.

According to an embodiment of the invention, stage 570 includes stage 571 of issuing a second reading request for a second size data from the USB mass storage device, which includes a reading start segment, and second number of segments to read, wherein the second number of segments is larger than the first number of segments. Conveniently, the reading start segment of the second reading request is the same as the reading start segment of the first reading request.

According to an embodiment of the invention, method 500 further includes stage 572 of providing the second reading request to the USB mass storage device over a wireless channel. It is noted that while method 500 is adapted, according to an embodiment of the invention, for a communication over a wired channel, many advantages of method 500 are especially desired while communicating over a wireless channel, as the bandwidth of wireless channels is typically a limited resource, and method 500 conveniently offers a way of using this resource more economically. Especially, according to some of the embodiments of the invention, method 500 is adapted to be carried out in one or more of the systems which are illustrated in FIGS. 1a through 1d.

Method 500 continues with stage 580 of receiving the second size data from the USB mass storage device. As aforementioned, the second size data includes the first size data which was requested in the first reading request, and conveniently includes data which is consecutive to the first size data in the memory unit of the USB mass storage device.

Stage 580 is followed by stage 581 of storing the second size data in the prefetched read data cache, wherein according to an embodiment of the invention, stage 581 includes stage 582 of storing only a portion of the second size data which does not include at least a portion of the first size data in the prefetched read data cache, wherein the first size data or at least a portion of it is provided during stage 590, without being stored at the prefetched read data cache. Conveniently, the storing further includes storing information which indicates the original locations of the data segments of the second size data on the memory unit of the USB mass storage device, so as to facilitate the carrying out of stage 560 in a future iteration of method 500 or of a portion of method 500.

It is clear to a person who is skilled in the art that conveniently, the process of storing overwrites old data which is stored in the prefetched read data cache.

As not all data transfers are successful, stage 580 may include receiving an error message which indicates that the data transfer of the second size data could not be completed, instead of the second size data. It is however clear to any person who is skilled in the art that the error may result from inability to transfer a portion of the second size data which does not include the first size data which was requested in the first reading request. Therefore, according to an embodiment of the invention, stage 580 includes stage 583 of issuing the first reading request, if a reading error occurred.

If the transmission of the first size data is successful, the first size data is then either stored in the prefetched read data cache or directly provided, instead of the second size data. If the transmission of the first size data is also unsuccessful, method 500 than includes providing of an error message, which conveniently indicates to the USB mass storage driver that the transaction could not be completed, usually in response to a get status request which is received.

Stage 580 is followed by stage 590 of providing the requested data from the prefetched read data cache, wherein the requested data is conveniently provided to the USB mass storage driver. It is noted that, according to an embodiment of the invention, the providing is carried out after receiving a get data command which is received from the USB mass storage driver.

It is noted that according to an embodiment of the invention, the providing demands copying the first size data from the prefetched read data cache. It is further noted that, according to an embodiment of the invention, stage 590 also include stage 591 of providing or intermediating a complete status command, which indicates to the USB mass storage driver that the transmission was successful, as illustrated in FIG. 5.

Figure 5:
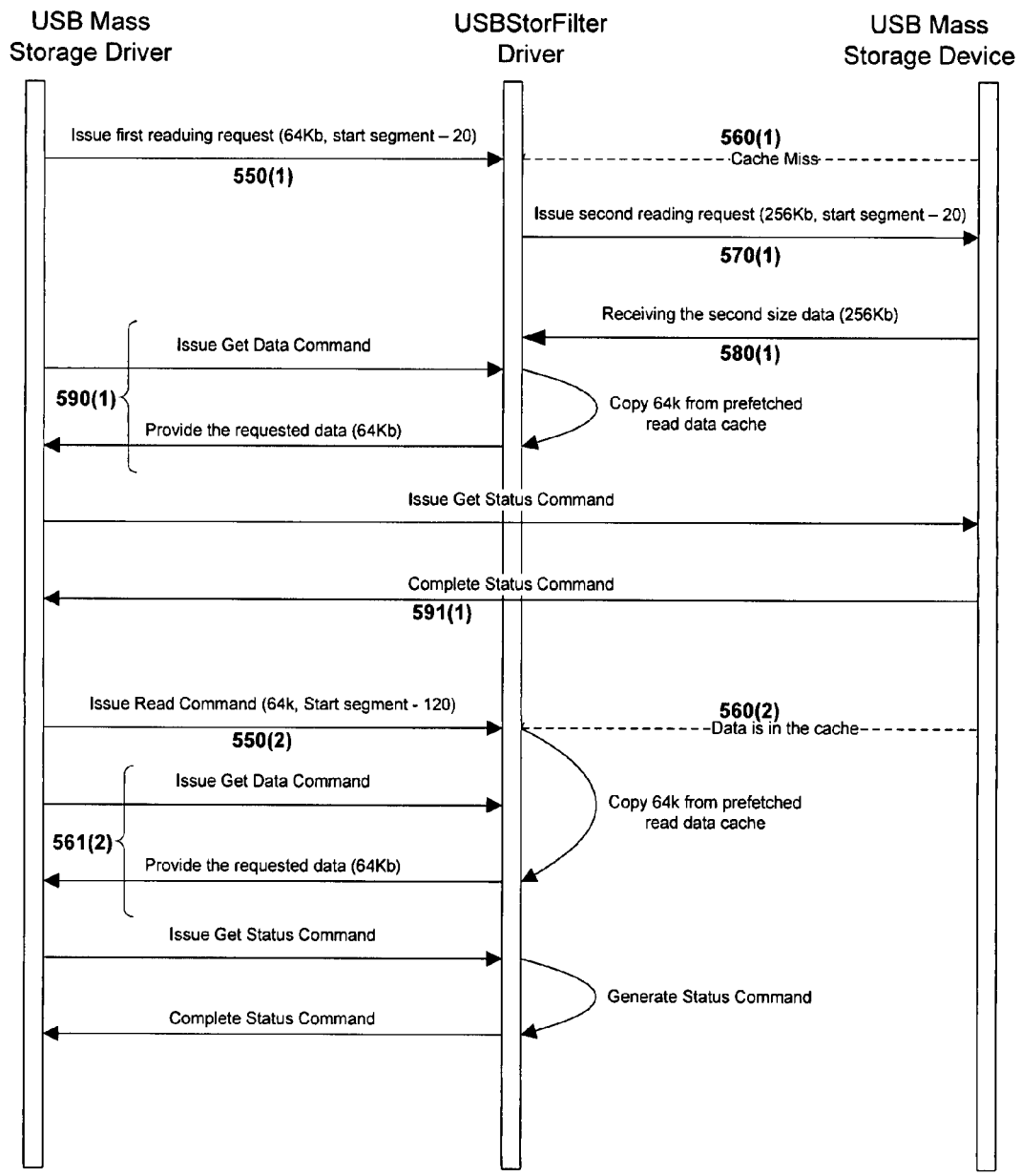
FIG. 5 illustrates prefetching and providing of data according to an embodiment of the invention.

FIG. 5 illustrates prefetching and providing of data according to method 500, according to an embodiment of the invention. During stage 550(1) the caching filter driver receives the first reading request, which is issued be the USB mass storage driver.

According to the example which is illustrated in FIG. 5, stage 560(1) results with a determination that the requested data is not included in the cache. The caching filter driver than carries out stage 570(1) of issuing the second reading requests, which includes the same start segment (20, in the illustrated example), and the second number of segments, (which amount to 256 Kb in the illustrated example), which is larger than the first number of segments (which amount to 64 Kb, in the illustrated example).

The USB mass storage device than send the second size data, which is received by the caching filter driver during stage 580(1). Stage 580(1) is followed by stage 590(1) of providing of the requested data to the USB mass storage driver, after copying it from the cache, and in response to a get data request which is issued by the USB mass storage driver. Stage 590(1) is followed by stage 591(1) of intermediating a complete status command, which is issued by the USB mass storage device in response to a get status command which is issued by the USB mass storage driver.

A second first reading request is received by the caching filter driver in second iteration of stage 550(1). Stage 560(2) results with a determination that the requested data is included in the cache, and therefore method 500 in the illustrated example continues with stage 561(2) of providing the requested data, after copying it from the cache, to the USB mass storage driver, following a get data command which is issued by the USB mass storage driver.

Method 500 continues with providing a complete status command to the USB mass storage driver, in response to a get status command which is issued by the USB mass storage command.

Figure 6:
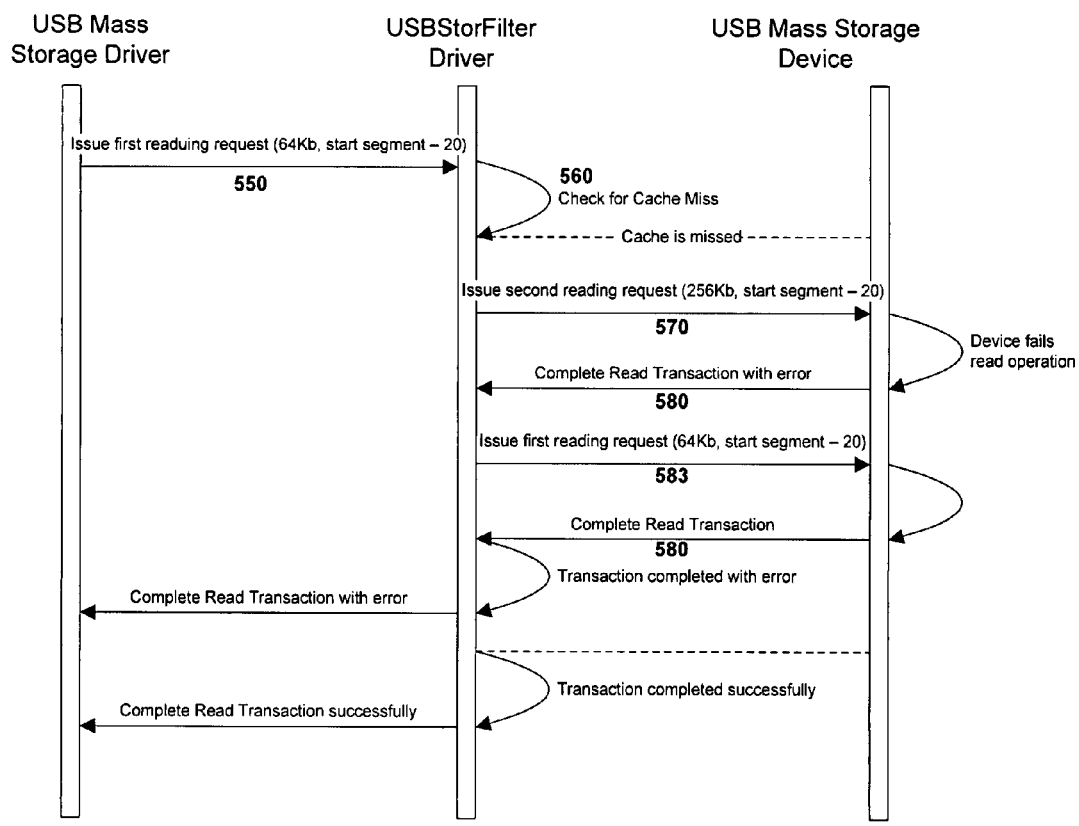
FIG. 6 illustrates error handling during prefetching and providing of data according to an embodiment of the invention.

FIG. 6 illustrates error handling during method 500, according to an embodiment of the invention. Starting from stage 550 of receiving a first reading request which is issued by the USB mass storage driver, the method continues as exemplified in FIG. 5 until stage 570 of issuing the second reading request.

Stage 580 however includes receiving an error message which indicates that the data transfer of the second size data could not be completed, instead of the second size data. It is however clear to any person who is skilled in the art that the error may result from inability to transfer a portion of the second size data which does not include the first size data which was requested in the first reading request. Therefore, stage 583 of issuing the first reading request, is carried out.

As can be seen in FIG. 6, if the transmission of the first size data is successful, the first size data is then transmitted to the USB mass storage driver. If the transmission of the first size data is also unsuccessful, method 500 than includes providing of an error message, which conveniently indicates to the USB mass storage driver that the transaction could not be completed, usually in response to a get status request which is received from the USB mass storage driver.

Figure 7:
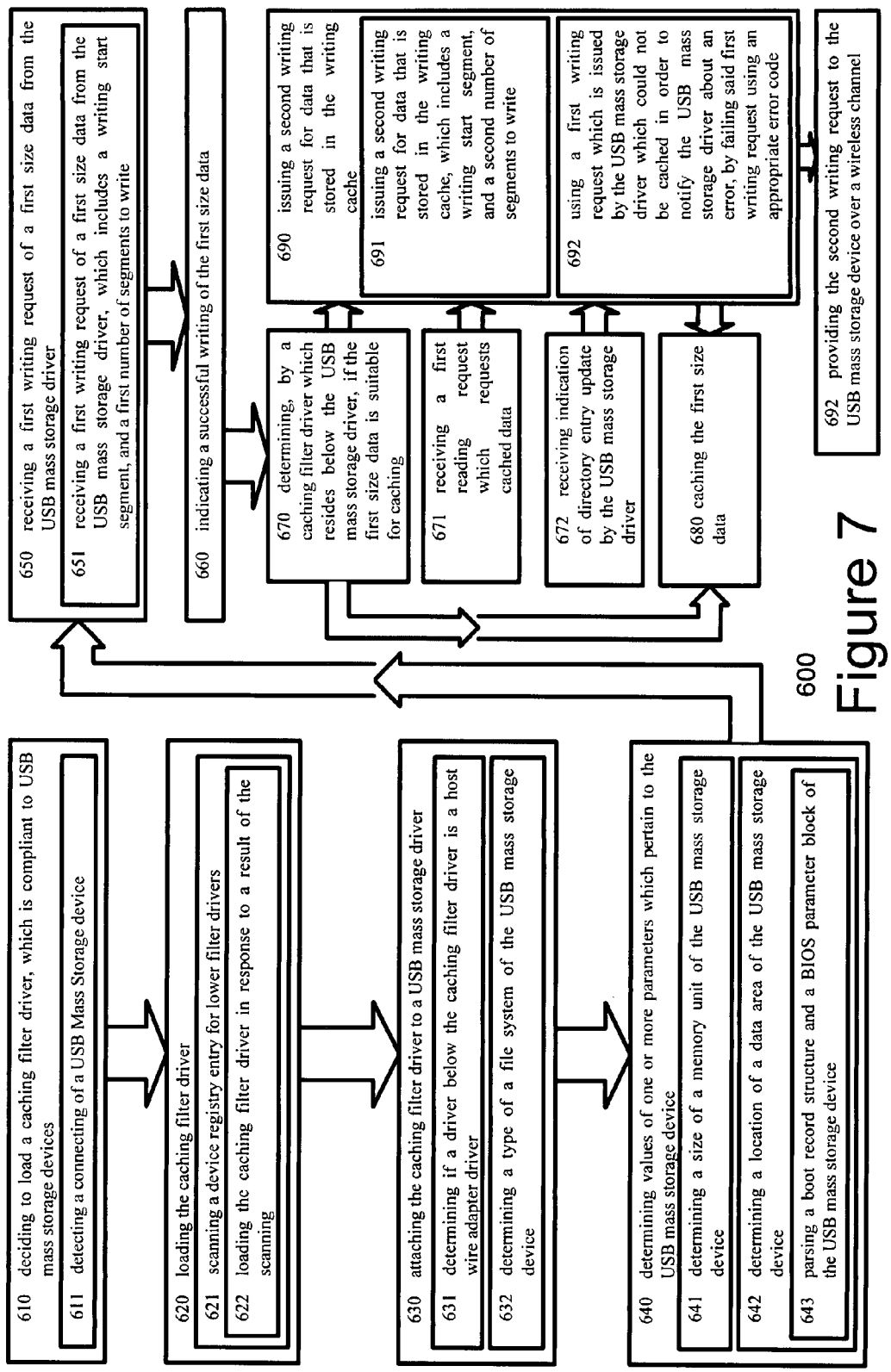
FIG. 7 illustrates a method for communicating with a USB mass storage device, according to an embodiment of the invention.

FIG. 7 illustrates method 600 for communicating with a USB mass storage device, according to an embodiment of the invention.

According to an embodiment of the invention, method 600 starts with stage 610 of deciding to load a caching filter driver, which is compliant to USB mass storage devices. It is noted that conveniently, the caching filter driver is not necessary for an ordinary operation of the USB mass storage driver, and therefore, according to an embodiment of the invention, may be loaded when needed. Conveniently, the deciding is carried out externally to the caching filter driver.

According to an embodiment of the invention, the deciding is triggered by stage 611 of detecting a connecting of a USB mass storage device. It is further noted that in situation in which the caching filter driver is already loaded, the detecting of a connecting of the USB mass storage device, according to an embodiment of the invention, triggers an attaching of the caching filter driver to the connected USB mass storage device and to one or more drivers of the USB mass.

According to an embodiment of the invention, method 600 continues with stage 620 of loading the caching filter driver.

Referring now to FIGS. 4a and 4b, the loading includes loading caching filter driver 200 as a lower filter driver between USB mass storage driver 210 and a host wire adapter driver (HWA driver) 220. Conveniently, the caching filter driver is adapted to operate in a manner which is transparent to USB mass storage driver 210 and to HWA driver 220. It is noted that, conveniently, caching filter driver 200 is a USB class filter driver.

It is clear to a person who is skilled in the art that the architectures suggested in FIGS. 4a and 4b allows a capturing by caching filter driver 200 all the commands and the data which are issued by USB mass storage driver 210 to USB mass storage device. It is further clear to a person who is skilled in the art that in order to support such architecture, caching filter driver 200 should conveniently be defined as a lower filter driver for USB mass storage driver 210.

Referring now back to FIG. 7, stage 620 of loading the caching filter driver includes stage 621 of scanning a device registry entry for lower filter drivers, wherein conveniently stage 620 also includes stage 622 of loading the caching filter driver in response to a result of the scanning.

According to an embodiment of the invention, method 600 continues with stage 630 of attaching the caching filter driver to the USB mass storage driver. According to an embodiment of the invention, the attaching is carried out by a user mode application which runs on the background.

According to an embodiment of the invention, stage 630 includes stage 631 of determining if a driver below the caching filter driver is a host wire adapter driver, wherein either the loading of the caching filter driver or an operation of the caching filter driver (embodiments of which are described below) is responsive to a result of the determining of stage 631. It is noted that more than one USB mass storage device may be connected to a system, and that conveniently, a caching which is carried out by the caching filter driver is to be carried out only for USB mass storage devices which are connected wirelessly to the system via a host wire adapter (HWA), and therefore it is desirable to determine to each of the USB mass storage devices if it is connected to the system via a HWA. According to an embodiment of the invention, stage 631 includes issuing to a stack, by the caching filter driver, a query interface request which includes an interface identification which is only supported by the HWA driver.

According to an embodiment of the invention, stage 630 further includes stage 632 of determining a type of a file system of the USB mass storage device, wherein the caching filter driver is only adapted to support certain types of files systems, and wherein the loading of stage 630 is conveniently responsive to a result of the determining of the type of the file system of the USB mass storage device.

It is noted that, according to an embodiment of the invention, the caching filter driver is adapted to support only USB mass storage device with a file system which implement either FAT32 or FAT16, wherein all the transactions to USB mass storage devices which implement another type of file system are intermediated as is.

It is noted that according to an embodiment of the invention, method 600 further includes unloading the caching filter driver when no longer needed (such as a result of disconnecting the USB mass storage device).

According to an embodiment of the invention, method 600 continues with stage 640 of determining values of one or more parameters which pertain to the USB mass storage device. Conveniently, stage 640 is carried out by the caching filter driver.

According to an embodiment of the invention, stage 640 includes stage 641 of determining a size of a memory unit of the USB mass storage device. As is detailed below, method 600 includes caching data that ought to be written to consecutive sectors of the memory unit, and therefore it is desirable to prevent issuing of a second reading request which refers to inexistent sectors (i.e. out of boundaries caching). According to an embodiment of the invention, the determining of the size of the memory unit is carried out by issuing a read capacity mass storage command.

According to an embodiment of the invention, stage 640 includes stage 642 of determining a location of data area 120 of the USB mass storage device. It is noted that conveniently, the caching filter driver is adapted to handle transactions of data from data area 120, and to intermediate data transactions of data which belongs to system area 110 without further handling. It is clear to any person who is skilled in the art that locations which are accesses in system area 110 are more scattered in comparison to accesses to data in data area 120, and it is less likely that data will be written to consecutive sectors in system area 110. Therefore, according to an embodiment of the invention, the determining of the location of data area 120 is required to facilitate the handling by the caching filter driver of only the reading requests which requests data from data area 120, as is detailed below.

According to an embodiment of the invention, stage 642 includes stage 643 of parsing a boot record structure and a BIOS parameter block of the USB mass storage device, wherein the parsing facilitates the determining of the location of data area 120.

Method 600 continues with stage 650 of receiving a first writing request of a first size data from the USB mass storage driver. The receiving of the first writing request includes receiving of the first size data. It is noted that according to an embodiment of the invention, the first size is 64 Kb. It is further noted that according to an embodiment of the invention, method 600 supports a reception of first writing requests of data of different first sizes.

According to an embodiment of the invention, stage 600 includes stage 651 of receiving a first writing request of a first size data from the USB mass storage driver, which includes a writing start segment, and a first number of segments to write. It is noted that conveniently, the receiving also includes receiving a memory location of the host, from where the first size data should be read.

According to an embodiment of the invention, stage 650 is followed by stage 660 indicating, conveniently to the USB mass storage driver, a successful writing of the first size data.

It is noted that even though the first size data was not yet written to the USB mass storage device, the indicating is typically demanded by the USB mass storage driver before it issues another first writing request which includes additional data, and therefore is also demanded for the caching. It is noted that according to different embodiment of the invention, the indicating is carried out in a later during method 600, in embodiments in which a later indicating could assist in preventing errors.

Method 600 continues with stage 670 of determining, by a caching filter driver which resides below the USB mass storage driver, if the first size data is suitable for caching. The main reasons for not being able to cache the first size data are: (a) caching the first size data would exceed a size of the writing cache; and (b) the first size data is not consecutive to data which is already stored in the writing cache (i.e. the writing start segments which pertains to a location in a memory unit of the USB mass storage device does not conform to the location in the memory unit of the USB mass storage device to which the data which is already stored in the writing cache should be written).

If the first size data is suitable for caching, method 600 continues with stage 680 of caching the first size data. The caching includes adding the first size data to the data which is already stored in the writing cache. It is noted that conveniently, the writing cache is a byte array that represents sequence of segments to be written, and is described by first segment number and last cached segment number, and therefore stage 680 conveniently includes updating the last cached segment number.

If the first size data is not suitable for caching, conveniently due to the above mentioned reasons, method 600 than continues with stage 690 of issuing a second writing request, for data that is stored in the writing cache, wherein the second writing request is provided to the USB mass storage device. It is noted that conveniently, the issuing includes providing the data to the USB mass storage device. It is further noted that conveniently, all the data which is stored in the writing cache is provided, albeit in embodiments of the invention which supports writing to the USB mass storage device by multiple applications, it is possible to issue a second writing request which pertains only to a cached data which was sent by a single application. Conveniently, after writing the cached data to the USB mass storage device, the first data is than cached.

According to an embodiment of the invention, stage 690 includes stage 691 of issuing a second writing request for data that is stored in the writing cache, which includes a writing start segment, and a second number of segments to write.

After the cached data was successfully transmitted to the USB mass storage device, the writing cache is conveniently empty, and ready to cache newly received data.

As aforementioned, an indication of a successful writing to the USB mass storage device is provided to the USB mass storage driver before an actual writing to the USB mass storage device had been attempted. Situations may occur in which the writing of cached data to the USB mass storage device may fail.

According to an embodiment of the invention, stage 690 includes stage 692 of using a first writing request which is issued by the USB mass storage driver which is not suitable for caching (as checked during stage 670) to notify the USB mass storage driver about the error, by failing this first writing request using an appropriate error code.

It is clear to any person who is skilled in the art that additional situations may require an emptying of the writing cache, other than those checked for during stage 670.

According to an embodiment of the invention, method 600 further includes stage 692 of providing the second writing request to the USB mass storage device over a wireless channel. It is noted that while method 600 is adapted, according to an embodiment of the invention, for a communication over a wired channel, many advantages of method 600 are especially desired while communicating over a wireless channel, as the bandwidth of wireless channels is typically a limited resource, and method 500 conveniently offers a way of using this resource more economically. Especially, according to some of the embodiments of the invention, method 600 is adapted to be carried out in one or more of the systems which are illustrated in FIGS. 1*a* through 1*d*.

According to an embodiment of the invention, method 600 further includes stage 671 of receiving a first reading request which requests cached data. Since the requested data was not yet written to the USB mass storage device (albeit counter indications were provided to the USB mass storage driver), the providing of the requested data directly from the writing cache may cause serious problems later on, if the writing to the USB mass storage device will turn unsuccessful. Therefore, according to an embodiment of the invention, the receiving of a first reading request which requests cached data will result of carrying out of stage 690. According to such an embodiment of the invention, the reading and/or prefetching of data from the USB mass storage device continues only after the writing of the cached data to the USB mass storage device is completed.

It is however noted that, according to an embodiment of the invention, the requested data is provided from the writing cache, without interrupting the caching process.

It is noted that, according to an embodiment of the invention in which the caching filter driver is adapted to manage caching and prefetching of both reading to and writing from the USB mass storing device, stage 671 includes receiving a first reading request which would lead to the issuing of a second writing request which requests data from a location that is to be written to with a cached data.

Another situation in which the cached data should be written to the USB mass storage device is, according to an embodiment of the invention, stage 672 of receiving indication of directory entry update by the USB mass storage driver.

The previously mentioned trigger for the writing of the cached data is receiving of additional data which is not suitable for caching. It is however clear that situation may arise in which a last portion of a data (such as the last portion of a file) in cached into the writing cache, and waiting for an additional data may take a while, and may never arrive (for example, if the last portion of data has been received and an indication of successful writing was provided to the USB mass storage driver, the user may disconnect the USB mass storage drive, before the cached data had actually been written to the USB mass storage device).

It is therefore desirable to determine when a last portion of a file has been cached and thus the writing cache requires flushing to the USB mass storage device. Ordinarily, the USB mass storage driver updates a directory entry of the file before a start of write file operation to a directory in which the file is stored, and after the file is completely written to the USB mass storage device.

Therefore, the receiving of indication of directory entry update by the USB mass storage driver results, according to an embodiment of the invention, a carrying out of stage 690. It is clear to a person who is skilled in the art that such an embodiment of the invention may require parsing of writing requests which are addressed to system area 110 of the memory unit of the USB mass storage device, and especially to FAT area 116. It is noted that in embodiments of the invention which support file systems which are either FAT16 or FAT32, first writing requests to the directory entry could be recognized by parsing the first 12 bytes of the first writing request, which conveniently has the following pattern: 0x2E, 0x20, 0x20, 0x20, 0x20, 0x20, 0x20, 0x20, 0x20, 0x20, 0x20, 0x10.

It is further noted that ordinarily, the USB mass storage driver updates the directory entry of a file which is smaller than 4 Kb only prior to the writing operation, and therefore, according to an embodiment of the invention, first writing requests for data which is smaller than 4 Kb are not cached but written to the USB mass storage device, and which conveniently is followed by a carrying out of stage 690. According to an embodiment of the invention, this condition is checked for during stage 670.

Figure 8:
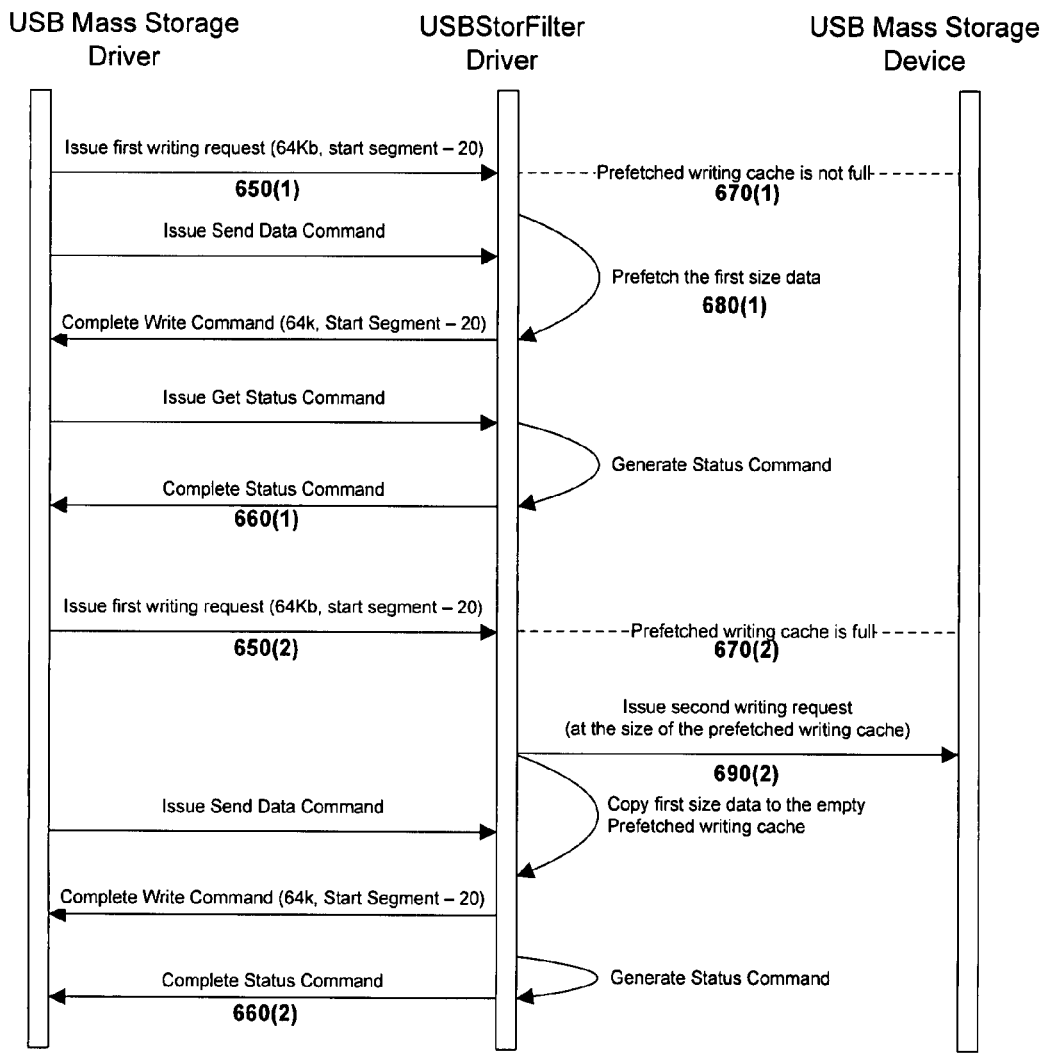
FIG. 8 illustrates caching and providing of data according to an embodiment of the invention.

FIG. 8 illustrates caching and providing of data according to method 600, according to an embodiment of the invention. A first writing request which is issued by the USB mass storage driver is received by the caching filter driver during stage 650(1). The method than continues with stage 670(1) of determining that the first size data is not suitable for caching. The first size data is than cached in stage 680(1), and an indication is provided to the USB mass storage driver at stage 660(1), which at the illustrated example follows stage 680(1).

Another first writing requests which is issued by the USB mass storage driver is than received by the caching filter driver during stage 650(2). The outcome of stage 670(2) is that the first size data of said first writing request is not suitable for caching, and therefore the caching filter driver issues a second writing request at stage 690(2), and all the cached data is than written to the USB mass storage device. Following this, the received first size data is cached in the writing cache. An indication is provided to the USB mass storage driver at stage 660(2), which at the illustrated example follows stage 680(2).

Figure 9:
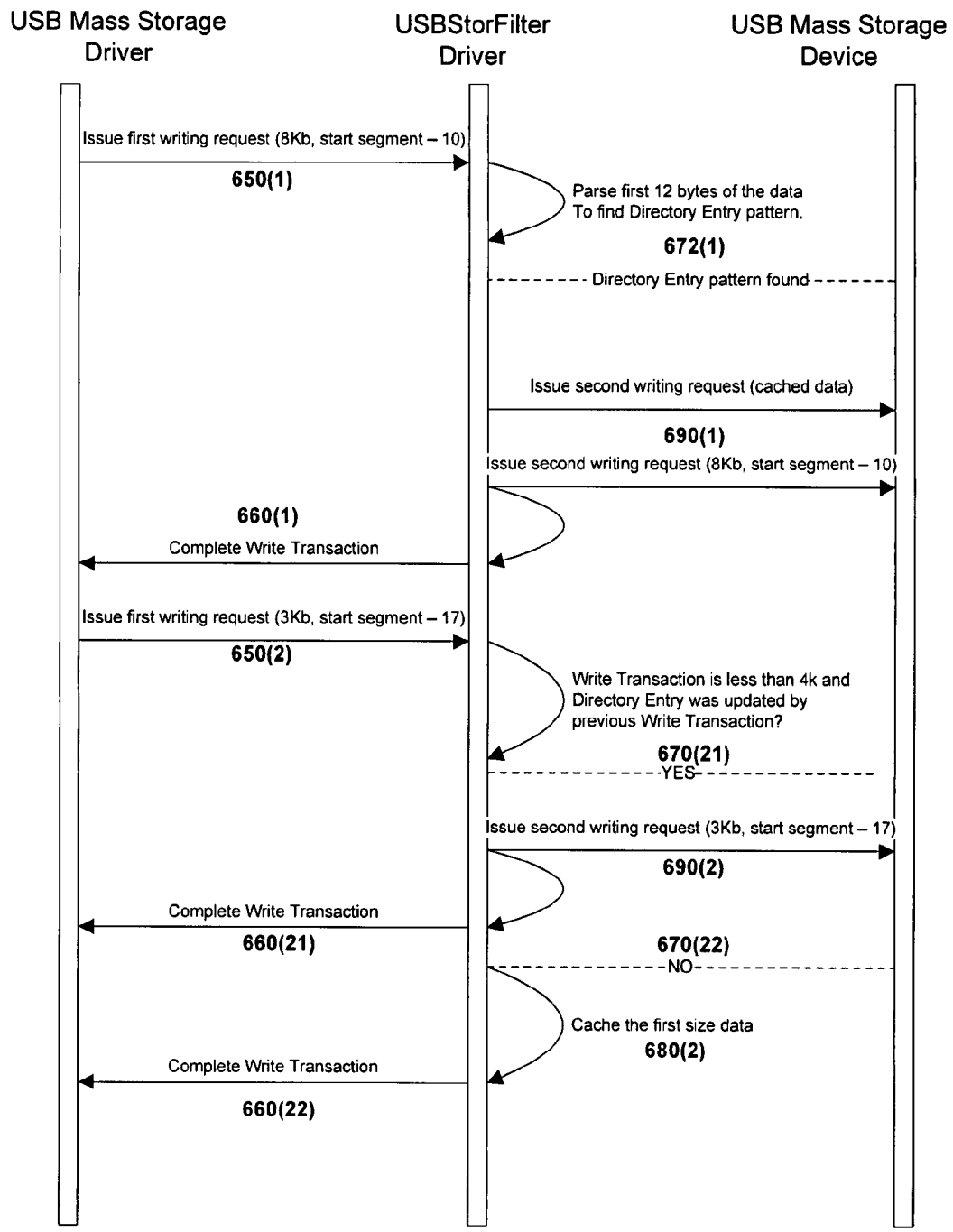
FIG. 9 illustrates caching and providing of data according to an embodiment of the invention.

FIG. 9 illustrates caching and providing of data according to method 600, according to an embodiment of the invention. First writing request which is issued by the USB mass storage driver is received by the caching filter driver during stage 650(1). During stage 672(1), the caching filter driver determines that an entry pattern had been changed, and therefore the entire writing cache is written to the USB mass storage device (690(1)) as well as the first size data (which carries the indication regarding the directory entry update). The writing cache is than empty, and an indication of successful writing is provided by the caching driver to the USB mass storage driver at stage 660(1).

Another first writing requests which is issued by the USB mass storage driver is than received by the caching filter driver during stage 650(2). During stage 670(21) it is determined that the first size data is smaller than 4 Kb (3 Kb in the illustrated example), and that the directory entry was updated in the previous writing request, and therefore the caching filter driver issues a second writing request and writes the first size data to the USB mass storage device, to prevent the aforementioned complications, an indication of successful writing would have been provided by the caching driver to the USB mass storage driver at stage 660(21). However, if the first size data was larger than 4 Kb (670(22)), the first size data would have been cached (680(2)) and similarly, an indication of successful writing would have been provided by the caching driver to the USB mass storage driver at stage 660(22).

Referring now back to FIGS. 4a and 4b, which illustrates caching filter driver 200 which is a lower filter driver for USB mass storage driver 210, and HWA driver 220, according to different embodiments of the invention.

According to the embodiment of the invention which is illustrated 4a, caching filter driver 200 is loaded as lower filter driver only for one or more USB mass storage drivers 210. Such an embodiment conveniently requires the some or all of the stages of deciding to load the caching filter driver, such as in response to a detection of a connecting of a USB mass storage device, scanning a device registry entry for lower filter drivers, and of attaching the caching filter driver to the USB mass storage driver, which are detailed pertaining to both method 500 and method 600, and wherein some of those stages conveniently require a user mode application which runs on the background.

Another embodiment of the invention is illustrated in FIG. 4b, wherein caching filter driver 200 is adapted to reside below different types of USB class drivers 212, one of which is USB mass storage driver 210. According to this embodiment of the invention, caching filter driver 200 conveniently requires initial one-time installing (which according to different embodiments of the invention is a carried out for method 500 and/or for method 600). After caching filter driver 200 is installed, it is conveniently adapted not to modify any communication of USB class drivers 212 which are not USB mass storage drivers 210, and to facilitate communication with one or more USB mass storage devices, according to the teaching of the invention.

It is further noted that such an embodiment of the invention facilitates using caching filter driver 220 to USB classes other than mass storage device USB class device (independently or together with USB mass storage driver 210).

Figure 1A:
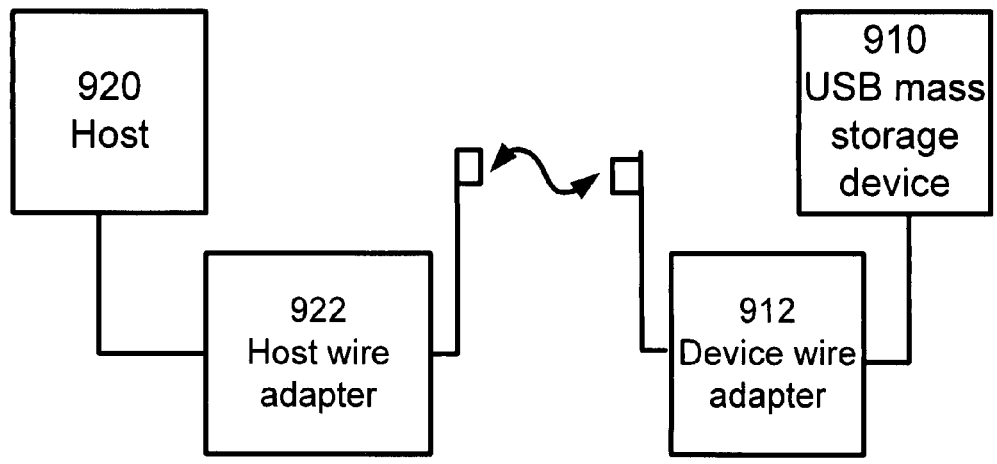
FIGS. 1a through 1d illustrate connection of a USB mass storage device to a host, according to different known prior art connection configurations.
Figure 1B:
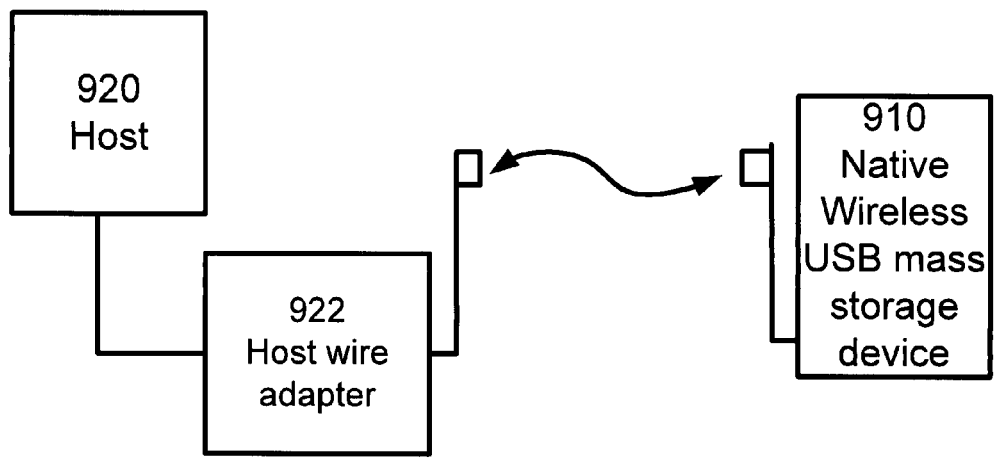

It is clear to a person who is skilled in the art that in embodiments of the invention wherein the host is a native wireless host (examples to such configurations are illustrated in FIGS. 1a and 1b), host wire adapter 220 which is illustrated in FIGS. 4a and 4b could be replaced with a wireless host controller interface (WHCI).

Figure 1C:
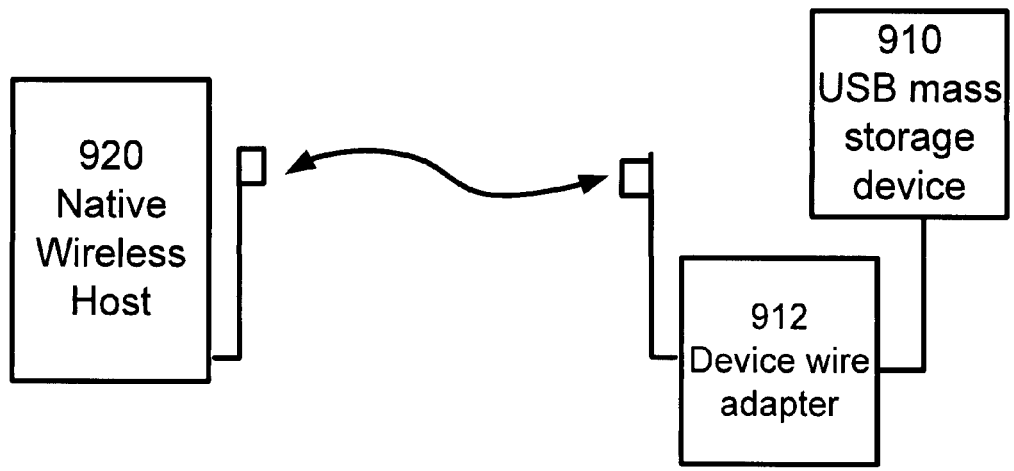
Figure 1D:
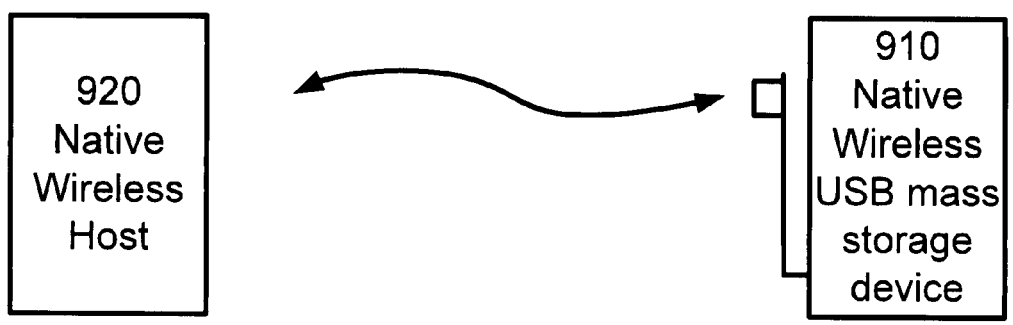
Figure 2:
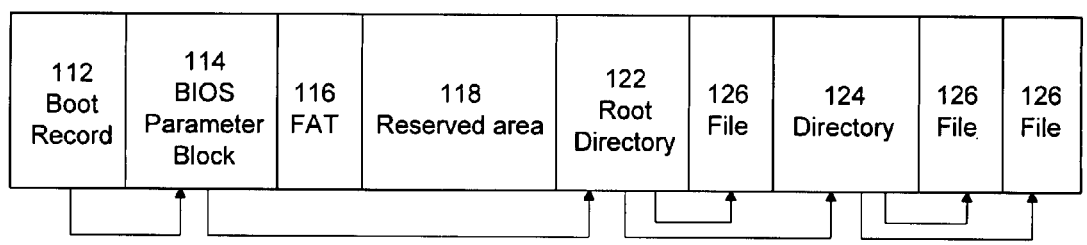
FIG. 2 is a block diagram of a memory unit of a USB mass storage device, which is known in the prior art.

According to an embodiment of the invention, device wire adapter 215 resides between catching filter driver 200 and host wire adapter driver 220 or wireless host controller interface, wherein USB mass storage device 910 is communicating wirelessly via device wire adapter 912 to which is connected (examples to such configurations are illustrated in FIGS. 1a and 1c).

According to one aspect of the invention, caching filter driver 200 is adapted for communicating with a universal serial bus (USB) mass storage device, and especially to: receive a first reading request for a first size data from USB mass storage driver 210; to determine if requested data which is requested in the first reading request is comprised in a prefetched read data cache; to issue a second reading request for a second size data to the USB mass storage device; and store the second size data in the prefetched read data cache, if the requested data is not included in the prefetched read data cache; and to provide the requested data from the prefetched read data cache; wherein the second size is larger than the first size and the second size data includes the first size data.

It is noted that according to different embodiments of the invention, caching filter driver 200 is adapted to carry out one or more stages of method 500, and that according to an embodiment of the invention, caching filter driver 200 is adapted to carry out or to participate in all the stages of method 500 which involves caching filter driver 200.

According to an embodiment of the invention, caching filter driver 200 is loaded in response to a detection of a connecting of a USB mass storage device.

According to an embodiment of the invention, caching filter driver 200 is further adapted to be attached to a USB mass storage device which is detected in a scanning of a registry for USB mass storage devices which are registered prior to a loading of caching filter driver 200.

According to an embodiment of the invention, caching filter driver 200 is further adapted to determine if requested data which is requested in the first reading request is comprised in the prefetched read data cache, to issue the second reading request and to store the second size data only if a driver of a USB mass storage device is a host wire adapter driver.

According to an embodiment of the invention, caching filter driver 200 is further adapted to determine a location of a data area of the USB mass storage device, and to determine if requested data which is requested in the first reading request is comprised in the prefetched read data cache, to issue the second reading request and to store the second size data only for requested data which is located in the data area.

According to a second aspect of the invention, caching filter driver 200 is adapted for communicating with a universal serial bus (USB) mass storage device, and is especially adapted to: receive a first writing request of a first size data from USB mass storage driver 210; to determine if the first size data is suitable for caching in a writing cache; to issue a second writing request of a second size data that is stored in the writing cache, if the first size data is not suitable for caching in the writing cache, wherein the second writing request is provided to the USB mass storage device; and to cache the first size data in the writing cache; wherein caching filter driver 200 resides below USB mass storage driver 210.

It is noted that according to different embodiments of the invention, caching filter driver 200 is adapted to carry out one or more stages of method 600, and that according to an embodiment of the invention, caching filter driver 200 is adapted to carry out or to participate in all the stages of method 600 which involves caching filter driver 200.

It is further noted that according to different embodiments of the invention, caching filter driver 200 is adapted to carry out one or more stages of method 500 and one or more stages of method 600, and that according to an embodiment of the invention, caching filter driver 200 is adapted to carry out or to participate in all the stages of both method 500 and of method 600 which involves caching filter driver 200.

According to an embodiment of the invention, caching filter driver 200 is further adapted to determine if the first size data is suitable for caching in the writing cache; to issue the second writing request and to cache the first size data in the writing cache; only if a driver of a USB mass storage device is a host wire adapter driver.

According to an embodiment of the invention, caching filter driver 200 is further adapted to determine if the first size data is suitable for caching in the writing cache; to issue the second writing request and to cache the first size data in the writing cache; only for first size data which is targeted to the data area.

According to an embodiment of the invention, caching filter driver 200 is further adapted to issue the second writing request of the second size data that is stored in the writing cache, following a receiving of an indication of a directory entry update by USB mass storage driver 210.

According to an embodiment of the invention, caching filter driver 200 is adapted for communicating with the USB mass storage device, by being adapted to carry out all of the following operations: receive a first writing request of a first size data from USB mass storage driver 210; to determine if the first size data is suitable for caching in a writing cache; to issue a second writing request of a second size data that is stored in the writing cache, if the first size data is not suitable for caching in the writing cache; to cache the first size data in the writing cache; receive a first reading request for a first size data from USB mass storage driver 210; to determine if requested data which is requested in the first reading request is comprised in a prefetched read data cache; to issue a second reading request for a second size data to the USB mass storage device; and store the second size data in the prefetched read data cache, if the requested data is not included in the prefetched read data cache; and to provide the requested data from the prefetched read data cache; wherein the second size is larger than the first size and the second size data includes the first size data; wherein caching filter driver 200 resides below USB mass storage driver 210.

According to an embodiment of the invention, caching filter driver 200 is further adapted to issue the second writing request of the second size data that is stored in the writing cache, following a receiving of a first reading request which requests cached data which is cached in the writing cache.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A method for communicating with a universal serial bus (USB) mass storage device, the method comprises:
   receiving, by a caching filter driver and from a USB mass storage device driver, a first reading request for a first size data from a USB mass storage driver; wherein the caching filter driver resides below the USB mass storage driver;
   determining, by the caching filter driver, if requested data which is requested in the first reading request is comprised in a prefetched read data cache;
   issuing by the caching filter driver a second reading request for a second size data to the USB mass storage device over a wireless channel;
   receiving the second size data from the USB mass storage device over the wireless channel;
   storing the second size data in the prefetched read data cache, if the requested data is not comprised in the prefetched read data cache;
   providing by the caching filter driver and to the USB mass storage device driver, the requested data from the prefetched read data cache; wherein the second size is larger than the first size and the second size data comprises the first size data; and receiving by the caching filter driver an error message which indicates that the data transfer of the second size data could not be completed; and issuing the first reading request by the caching filter driver.

2. The method according to claim 1, further comprising detecting if a driver of a USB mass storage device is a host wire adapter driver, wherein the method is carried out only for USB mass storage devices which are connected via a host wire adapter.

3. The method according to claim 1, further comprising determining a location of a data area of the USB mass storage device, wherein the stages of determining and of issuing the second reading request are only carried out for requested data which is located in the data area.

4. A caching filter driver which is adapted for communicating with a universal serial bus (USB) mass storage device, the caching filter driver is adapted to:
- receive from a USB mass storage device driver a first reading request for a first size data from a USB mass storage driver;
- determine if requested data which is requested in the first reading request is comprised in a prefetched read data cache;
- issue over a wireless channel a second reading request for a second size data to the USB mass storage device and store the second size data in the prefetched read data cache, if the requested data is not comprised in the prefetched read data cache;
- receive over the wireless channel the second size data from the USB mass storage device over the wireless channel; and to
- provide the requested data from the prefetched read data cache; wherein the second size is larger than the first size and the second size data comprises the first size data;
- wherein the caching filter driver resides below the USB mass storage driver;
- wherein the caching filter driver is further adapted to receive an error message which indicates that the data transfer of the second size data could not be completed; and issue the first reading request by the caching filter driver.

5. The caching filter driver according to claim 4, wherein the caching filter driver is loaded in response to a detection of a connecting of a USB mass storage device.

6. The caching filter driver according to claim 4, further adapted to determine if requested data which is requested in the first reading request is comprised in the prefetched read data cache, to issue the second reading request and to store the second size data only if a driver of a USB mass storage device is a host wire adapter driver.

7. The caching filter driver according to claim 4, adapted to determine a location of a data area of the USB mass storage device, and to determine if requested data which is requested in the first reading request is comprised in the prefetched read data cache, to issue the second reading request and to store the second size data only for requested data which is located in the data area.

\* \* \* \* \*